3,677,814
Patented July 18, 1972

3,677,814
PROCESS FOR FORMING ELECTROCONDUCTIVE TIN OXIDE FILMS BY PYROLYZATION OF ALKYL AND ARYL TIN FLUORIDES
Frank H. Gillery, Allison Park, Pa., assignor to PPG Industries, Inc., Pittsburgh, Pa.
No Drawing. Continuation of application Ser. No. 701,098, Jan. 29, 1968. This application Oct. 26, 1970, Ser. No. 84,240
Int. Cl. H05b 3/14
U.S. Cl. 117—211
11 Claims

ABSTRACT OF THE DISCLOSURE

This invention resulted from the discovery that prior electroconductive tin oxide films on a refractory substrate. It particularly relates to the formation of transparent electroconductive tin oxide films by pyrolysis of a tin organic compound which has a direct tin-fluoride bond. More particularly, this invention pertains to a process for forming transparent electroconductive tin oxide films on a glass substrate by pyrolyzation of a solution containing organic tin fluorides which have a direct tin-fluoride bond, especially solutions of alkyl tin polyfluorides such as dialkyl tin difluorides.

BACKGROUND

This application is a continuation of application Ser. No. 701,098 filed Jan. 29. 1968, now abandoned.

Electroconductive tin oxide films have found useful application in numerous articles such as airplane windows, hot plate bases, and the like. One common procedure for forming these electroconductive tin oxide films involved pyrolysis of film-forming, tin-containing materials such as an organic or inorganic tin compound, upon a hot substrate.

Inorganic tin compounds were utilized earlier than organic tin compounds as film formers in pyrolyzation processes; however, each has attendant disadvantages. Tin oxide coatings formed from stannic chloride, for example, were adequately electroconductive but were not entirely satisfactory as transparent films because of haze formation. The utilization of organic tin compounds in pyrolyzation processes represented an advance in the art inasmuch as transparent electroconductive tin oxide films could be formed with significantly less haze than those formed from inorganic tin compounds.

A further advance in the art, as taught in Lytle et al., U.S. Pat. 2,566,346, involved the addition of a fluorine-containing compound to an organic tin coating composition to produce a fluorine-containing tin oxide film. These films were more electroconductive than non-fluorine modified tin oxide films. It has been found through experience with fluorine-containing tin oxide films that, generally, the greater the concentration of fluorine in the film, the greater the electroconductivity of the film. The maximum compatible concentration of fluorine in prior art tin coating solutions capable of forming suitable transparent films has been about 0.23:1 reported as HF:Sn weight ratio. Thus, it has been one objective in this art to form films containing increasingly larger concentrations of fluorine.

It has also been an objective in the art to eliminate hydrofluoric acid from the film-forming solutions. Hydrofluoric acid is one of the most commonly utilized sources of fluorine in the coating solutions. However, corrosion of metals or slight etching of glass frequently results from its presence in the coating solutions.

It has now been discovered that a transparent, electroconductive tin oxide film having substantially no haze or texture can be formed from organic tin fluorides wherein the fluoride atom is attached directly to the tin atom. It has further been discovered that especially good films are formed from solutions of alkyl tin fluorides, particularly alkyl tin polyfluorides. Resistances as low as 15 ohms/square have been obtained for films of second order red thicknesses by pyrolyzation of solutions of alkyl tin fluorides such as dibutyl tin difluoride. The fluorine to tin ratio for a dialkyl tin difluoride is 0.32:1.

This invention resulted from the discovery that prior art coating solutions may, under certain conditions, contain in very minor amounts organic tin fluorides having Sn-F bonds from reaction of HF with compounds such as dibutyl tin diacetate. However, the effect of the compounds was largely undetected inasmuch as the major film former was a tin compound which did not have direct F to Sn bonds. In prior art solutions, the quantity of organic tin compounds having a direct F to Sn bond was less than about one percent by weight of the coating solution.

The organic tin fluoride compounds useful in this invention are those having a direct fluoride to tin bond and wherein each organic group consists of about 10 or less carbon atoms. The preferred organic tin fluorides are alkyl tin fluoride compounds having about 1 to about 10 carbon atoms in each alkyl group, although preferably from about 1 to about 6 carbon atoms; with especially good results having been achieved through the use of dialkyl tin difluorides such as dibutyl tin difluoride. The organic groups of the organic tin fluorides used in this invention may contain additional groups such as halogens, hydroxyls carboxyls, ethers, and the like.

Organic tin fluoride compounds useful in this invention may be illustrated by the formula

$$(R)_x\text{--Sn--}F_{4-x}$$

wherein R is an organic group containing from about 1 to about 10 carbon atoms, and preferably from about 1 to 6 carbon atoms and $x$ has values 1, 2, or 3. The organic group may be aryl or alkyl groups consisting solely of carbon and hydrogen atoms, or additional elements may be present.

Typical alkyl tin fluoride compounds useful in this invention include: methyl tin trifluoride, dimethyl tin difluoride, trimethyl tin fluoride, ethyl tin trifluoride, diethyl tin difluoride, triethyl tin fluoride, propyl tin trifluoride, dipropyl tin difluoride, tripropyl tin fluoride, butyl tin trifluoride, dibutyl tin difluoride, tributyl tin fluoride, pentyl tin trifluoride, dipentyl tin difluoride, tripentyl tn fluoride, hexyl tin trifluoride, dihexyl tin difluoride, and trihexyl tin fluoride. As illustrated by the above-mentioned compounds, the alkyl chain may be linear or branched.

Aryl tin fluorides useful in this invention include diphenyl tin difluoride, tolyl tin trifluoride, tribenzyl tin fluoride and the like.

The concentration of organic tin compound having a direct F to Sn bond, e.g., alkyl tin fluoride, in the coating solution may vary from about 2 percent by weight to about 75 percent by weight, although preferably from about 5 percent by weight to about 70 percent by weight. In a commercial process, best results are obtained when the dialkyl tin difluoride is present in the solution as about 10 percent by weight to 65 percent by weight of solution. The maximum concentration of dialkyl tin difluoride in the solution is determined primarily by the solvent system utilized.

Organic tin compounds containing fluorine directly bonded to tin, e.g., alkyl tin fluorides, are soluble in water and numerous organic solvents, especially polar organic solvents. The solubility is generally slight, less than about 10 percent by weight, unless a solvating agent is added. Solutions of less than 10 percent by weight of the above-described organic tin compounds are useful, although preferred solutions for commercial processes generally contain a solvating agent to increase solubility inasmuch as film formation occurs faster from concentrated solutions.

The presence of an amine or ammonium compound in the coating solution increases the solubility of alkyl tin fluoride compounds. The alkyl tin fluoride compound may be complexed first with an amine or ammonium compound before being added to an appropriate solvent or the amine or ammonium compound may be added to an admixture of alkyl tin fluoride and solvent.

Trialkyl amines have been found to be very effective solvating agents for increasing solubility of alkyl tin fluoride compounds in polar organic solvents such as an organic alcohol. Typical trialkyl amines found useful for this purpose are trimethyl amine, triethyl amine, tributyl amine, and the like. Especially good results have been achieved utilizing triethyl amine.

Other amines useful as solvating agents for dialkyl tin difluoride compound are ethanol amines such as monoethanol amine, diethanol amine, and triethanol amine, but these tend to give solutions yielding films of higher resistance than solutions containing alkyl amines.

Ammonia and ammonium compounds are especially effective complexing agents for alkyl tin fluoride compounds when dissolving such in water or highly polar organic solvents. Ammonium halides such as ammonium fluoride, ammonium chloride and the like have been especially effective for dissolving alkyl tin fluoride compounds in water.

Solvents useful for preparing solutions of alkyl tin fluoride compounds include polar organic solvents such as alcholos, esters, ketones, and the like. Appropriate solvents include the following: methyl alcohol, ethyl alcohol, butyl alcohol, octyl alcohol, ethylene glycol, diethylene glycol, propylene glycol, dibutylene glycol, dimethyl ketone, dipropyl ketone, methyl acetate, propyl acetate, butyl propionate, and the like. The solubility of alkyl tin fluoride compounds is very high in methanol.

Water-alcohol mixtures containing as much as 50 percent water may be utilized as the solvent. Especially good results have been obtained using ammonium fluoride, dibutyl tin difluoride, and an alcohol-water solvent as a coating solution. The ammonium fluoride, besides serving as a solvating agent, also increases the fluorine to tin ratio of the solution. This has the effect of lowering the resistance of the resulting films. However, the addition of fluorine in this manner is not so efficient as might be expected since it is not directly bonded to the tin atom. Thus, large additions of ammonium fluoride only lower the film resistance slightly, and have the disadvantage of causing considerable cloudiness of the film.

Although solutions of the organic tin fluoride film former are preferred for forming transparent films, suspensions of organic tin fluorides in fluids, preferably liquid, e.g., a colloidal dispersion, are useful in the preparation of electroconductive films.

The instant invention is particularly useful in forming electroconductive transparent films upon a refractory substrate. The electroconductivity of the film may be varied by varying the thickness of the film. It is significant to note that by the use of this invention, films of about 270 millimicrons thickness may be formed with a surface resistance of as low as about 15 oms/square. The thickness is determined by the interference color of the film. A film of about 270 millimicrons thickness has an interference color of second order red.

The refractory substrate may be any material capable of withstanding temperatures of about 400° F. without substantial oxidation. The preferred refractory substrates are various ceramics and glass. Glass, of course, is the preferred substrate when forming transparent, electroconductive films. The type of glass is not critical and any of the commercially-available types which do not become unduly distorted at the pyrolyzation temperatures may be utilized. Examples of such glasses include the alkali-lime-silica glasses, the boro-silicate glasses, the alumino-silicate glasses, boro-alumino silicate glasses, phosphate glasses, fused silica, and the like.

As stated above, the minimum pyrolyzation temperature for the purpose of this invention is about 400° F. The preferred temperature range for film formation on soda-lime-silica glass is from about 900° F. to about 1350° F., but much higher temperatures may be used to advantage with more refractory glasses. The usual method of forming electroconductive films is to contact the hot glass with the coating solution, preferably in the form of a spray or mist. The following examples illustrate specific embodiments of the instant invention; however, the invention is not to be construed as being limited solely thereto, but to include all the variations hereinabove described.

In the following examples, the pyrolysis temperature at the start of the process was about 1200° F. to about 1300° F. As indicated above, a precise temperature is not especially critical so long as the temperature falls within the pyrolyzation temperature range set forth above.

The glass utilized in the following examples was a soda-lime-silica glass having a soda content in the range of about 10 percent by weight to about 20 percent by weight and a calcium oxide content of about 5 percent by weight to about 15 percent by weight.

EXAMPLE I

A piece of clear sheet glass was heated to a temperature of about 1300° F. and sprayed with the following solution:

Dibutyl tin difluoride: 450 grams
Triethyl amine: 155 milliliters
Methanol added until the solution comprised 1 liter.

A film of second order red (thickness of about 270 millimicrons) had a resistance of about 15 to 20 ohms/square. The film contained no haze or texture.

Similar results are obtained when dimethyl tin difluoride, diethyl tin difluoride, and dipropyl tin difluoride are utilized in place of dibutyl tin difluoride.

EXAMPLE II

A piece of clear sheet glass was heated to about 1300° F. and sprayed with the following solution:

Ammonium fluoride: 200 grams
Dibutyl tin difluoride: 150 grams
Water: 350 milliliters
Methanol: Additions necessary to make a solution of 1 liter.

A second-order red film was formed having a resistance of about 12 to 15 ohms/square. Film contained no texture and a minimum amount of haze.

EXAMPLE III

In order to determine the optimum pyrolyzation temperatures for a solution comparable to that utilized in Example I above and soda-lime-silica glass, a number of films were formed at temperatures ranging from about 800° F. to 1400° F. The resistance per square (ohms) for films of a second order red film range from about 30 ohms/square for a temperature of about 1130° F. to a minimum resistance of about 20 ohms/square for a temperature of about 1290° F.

The upper temperature limit is caused by a property of the glass rather than the solution. Lower resistance, better quality films can be formed on higher temperature glasses such as Pyrex or Vycor.

The glass surface temperatures were measured with a Thermodot temperature measuring device before, during, and after spraying. A compensation was applied for the emissivity of the film.

EXAMPLE IV

To illustrate the effectiveness of alkyl tin fluoride compounds in forming pyrolytic electroconductive tin oxide films, the following solution was sprayed upon a soda-lime-silica glass at about 1300° F.:

Dibutyl tin difluoride: 7.5 grams
Ethyl alcohol containing 10 percent hydrofluoric acid: 100 milliliters The resulting film had a resistance of 20 ohms/square at a film thickness of second order red.

This example illustrates that useful coating solutions can be produced without use of a solvating agent. It also illustrates that HF in the solution is not very effective in lowering resistance.

EXAMPLE V

A piece of ¼-inch plate of soda-lime-silica glass was sprayed at 1300° F. with the following solution:

Ammonium acetate: 8.0 grams
Ethyl alcohol: 22.0 grams
Dibutyl tin difluoride: 20.0 grams The resulting film had a resistance of 15 ohms/square at a second order red thickness.

EXAMPLE VI

A piece of ¼-inch plate of soda-lime-silica glass was sprayed at 1350° F. with a solution containing 380 grams of dibutyl tin difluoride and one liter of methyl alcohol saturated with ammonia.

The resulting film had a resistance of 25 ohms/square at a thickness of second order red.

EXAMPLE VII

A colloidal dispersion of dibutyl tin difluoride in xylene was sprayed upon a glass sheet under pyrolytic conditions. A good optical quality tin oxide film was obtained, although the film had a higher specific resistivity than tin oxide films prepared from a solution of an organic tin compound.

Alkyl tin fluoride compounds and other organo tin compounds having fluorine directly bonded to the tin atom are known in the art. Dibutyl tin difluoride utilized in the above examples was prepared by reacting stoichiometric quantities of dibutyl tin diacetate and hydrofluoric acid, the HF being present as a 10 percent solution in alcohol. The resulting dibutyl tin difluoride was washed with cold water to remove the acetic acid and then dried. Other alkyl tin fluorides can be readily prepared from corresponding alkyl tin acetates.

Transparent tin oxide coatings of the type formed in the above examples have found utility as solar control films for glass. Tin oxide films reflect infrared light, thereby providing a useful transparent film for glass closures of air-conditioned buildings and the like. The films described herein have a higher infrared reflectivity than tin oxide films of comparable resistance produced by processes utilizing a tin compound which did not have a direct F to Sn bond.

While the instant invention has found particular utility in forming electroconductive, transparent films, it has utility in non-transparent applications as well. For example, in the preparation of a printed circuit, conduits of a specified thickness will be more electroconductive if prepared by the process of the instant invention than leads of the same thickness prepared by prior art processes.

In a process according to the instant invention wherein non-transparent tin oxide films are formed, it is not so critical for the fluorine-containing compound to be completely pyrolyzable; that is, the non-fluorine portion of the fluorine-containing compound may remain in the resulting film. Such impurities may affect the electroconductivity of such films; therefore, even with non-transparent films it is preferred to use a pyrolyzable fluorine compound.

The term ohms/square has been used hereinabove to describe the resistance of the films formed by the novel process of this invention. Although specific resistivity is usually utilized to describe or compare the resistance of materials, it is inappropriate for describing the resistance of very thin films because of the difficulty of measuring the thickness of the film.

Specific resistivity is the resistance between opposite faces of a cubic centimeter of material and is expressed by the equation $$\rho = \frac{R \times A}{L}$$

where $\rho$ is the specific resistance, R is the resistance of the conductor, A is the cross-sectional area of the conductor, and L is the length of the conductor. For a thin film this expression becomes $$\rho = \frac{R \times W \times t}{L}$$

wherein W and L are the surface dimensions and $t$ is the film thickness. For a square area of surface, W and L are equal and $\rho = R \times t$ or R (resistance for a square area of surface) $= \rho/t$. Thus, the resistance of various types of films having approximately equivalent thickness may be directly compared by comparing resistance per square.

The thickness of a thin film may be determined by the interference color shown in reflected light, provided the index of refraction is known. For stannic oxide films, a second-order red color indicates a thickness of about 270 millimicrons while a second-order blue color indicates a thickness of about 130 millimicrons. As the thickness of the film increases, its apparent color changes and the order or succession of the colors with increasing thickness is analogous to that of the well-known Newton rings described in The Theory of Optics by Paul Drude, Dover Publications, Inc., New York, at page 136 et seq.

Although specific embodiments of the invention have been set forth hereinabove, the invention is not limited solely thereto, but includes all the variations coming within the scope of the following claims.

What is claimed is:

1. In the method of forming electroconductive tin oxide films on a refractory substrate by contact with a film-forming composition having a source of tin and a source of fluorine, the improvement comprising contacting the substrate at a temperature above 400° F. and below a temperature at which said substrate becomes distorted with a composition containing as an essential ingredient an organic tin fluoride having a direct bond between tin and fluorine and having at least one organic group directly bonded to tin, said organic group being selected from alkyl and aryl groups having up to 10 carbon atoms.

2. The improvement of claim 1 wherein the composition contains at least about 2 percent by weight of the organic tin fluoride.

3. The improvement of claim 1 wherein the composition contains at least 10 percent by weight of the organic tin fluoride.

4. The improvement of claim 1 wherein the substrate is glass.

5. The improvement of claim 1 wherein said organic group is an alkyl group.

6. The improvement of claim 5 wherein 2 alkyl groups are bonded to the tin.

7. The method of claim 6 wherein the alkyl groups are butyl groups having 4 carbon atoms.

8. The method of claim 1 wherein the composition contains an organic amine in sufficient amount to increase the solubility of the organic tin fluoride to more than 10 percent by weight, said organic amine being taken from the class consisting of alkyl amines and ethanol amines.

9. The method of claim 1 wherein ammonium fluoride is present in sufficient amount to produce a resulting film having a maximum resistance of 15 ohms per square at a thickness of about 270 millimicrons.

10. The method of claim 1 wherein the composition contains ammonia in sufficient amount to increase the solubility of the organic tin fluoride to more than 10 percent by weight.

11. The improvement of claim 1, wherein said organic tin fluoride is dibutyl tin difluoride.

References Cited
UNITED STATES PATENTS

| | | | |
|---|---|---|---|
| 2,566,346 | 9/1951 | Lytle et al. | 117—54 |
| 2,724,658 | 11/1955 | Lytle | 117—54 |

RALPH S. KENDALL, Primary Examiner

U.S. Cl. X.R.

117—124 A, 229, 123 A